US005615226A

United States Patent [19]

Lipa

[11] Patent Number: 5,615,226
[45] Date of Patent: Mar. 25, 1997

[54] METHOD AND RECEIVER FOR DEMODULATING A RECEIVED SIGNAL

[75] Inventor: Robert A. Lipa, Aurora, Ill.

[73] Assignee: Motorola, Inc., Schaumburg, Ill.

[21] Appl. No.: 394,972

[22] Filed: Feb. 27, 1995

[51] Int. Cl.$^6$ ........................................... H04B 1/69
[52] U.S. Cl. .................................................. 375/200
[58] Field of Search .................... 375/200, 205, 375/206; 380/34; 370/18, 22

[56] References Cited

U.S. PATENT DOCUMENTS

| | | | |
|---|---|---|---|
| 5,224,127 | 6/1993 | Okanoue | 375/343 |
| 5,272,727 | 12/1993 | Okanoue | 375/340 |
| 5,465,269 | 11/1995 | Schaffner et al. | 375/200 |

OTHER PUBLICATIONS

Walton, Rod and Wallace, Mark, "Near Maximum Likelihood Demodulation for M-ary Orthogonal Signalling", GTE Laboratories Incorporated, 1993 IEEE.

Primary Examiner—Stephen Chin
Assistant Examiner—Kevin Kim
Attorney, Agent, or Firm—Jeffrey G. Toler; Dale B. Halling

[57] ABSTRACT

A method and receiver for demodulating a DS/CDMA signal increases a receiver's (60) sensitivity and as a result the system capacity of a DS/CDMA cellular communications system. A Reduced State Sequence Estimator (RSSE) (68) finds a path (210) with the highest energy. An efficient method and apparatus for determining the path energies (212) selects a new path (210) to differ from a previous path (210) by a single reduced state (200). A difference (306) between an I and Q magnitude of the new and omitted reduced state (200) is computed (304). This difference is added to the previous path's total I (308) and Q magnitude, to compute the new path's I and Q magnitude. These I and Q magnitudes are used to compute a path energy (322) and the highest path's energy (326) is used to select the best path for decoding (70).

14 Claims, 5 Drawing Sheets

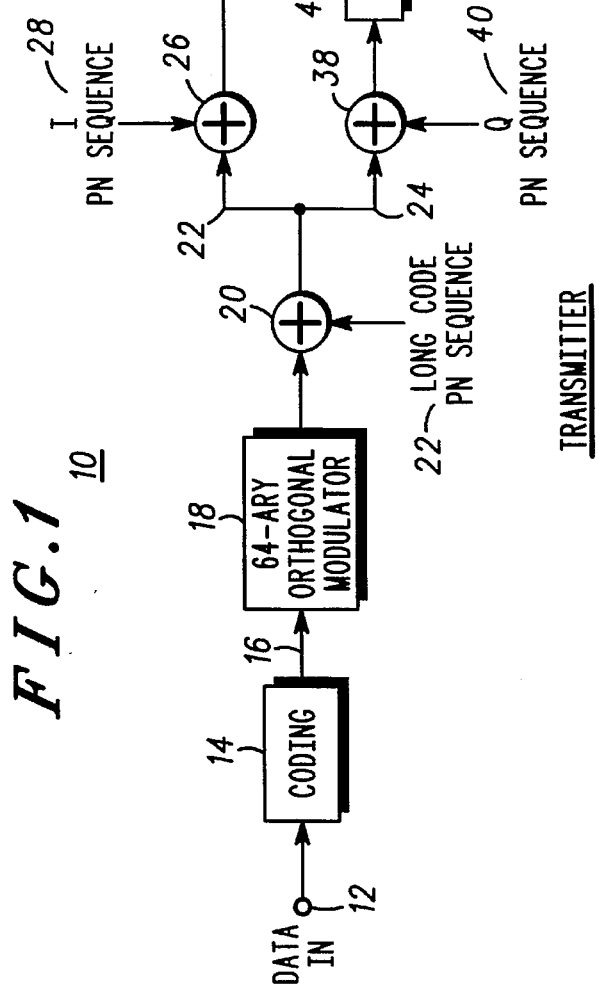
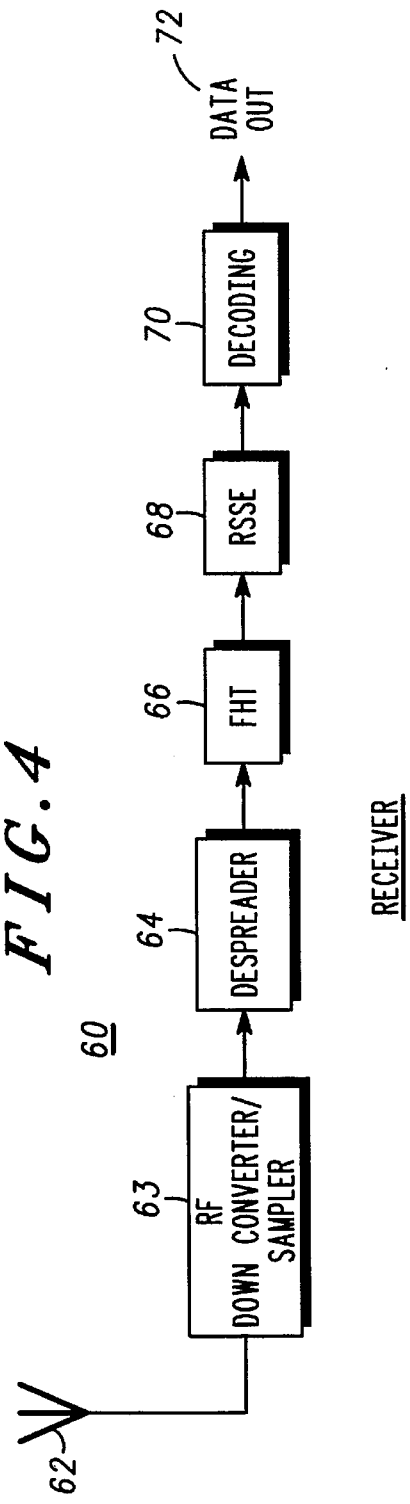

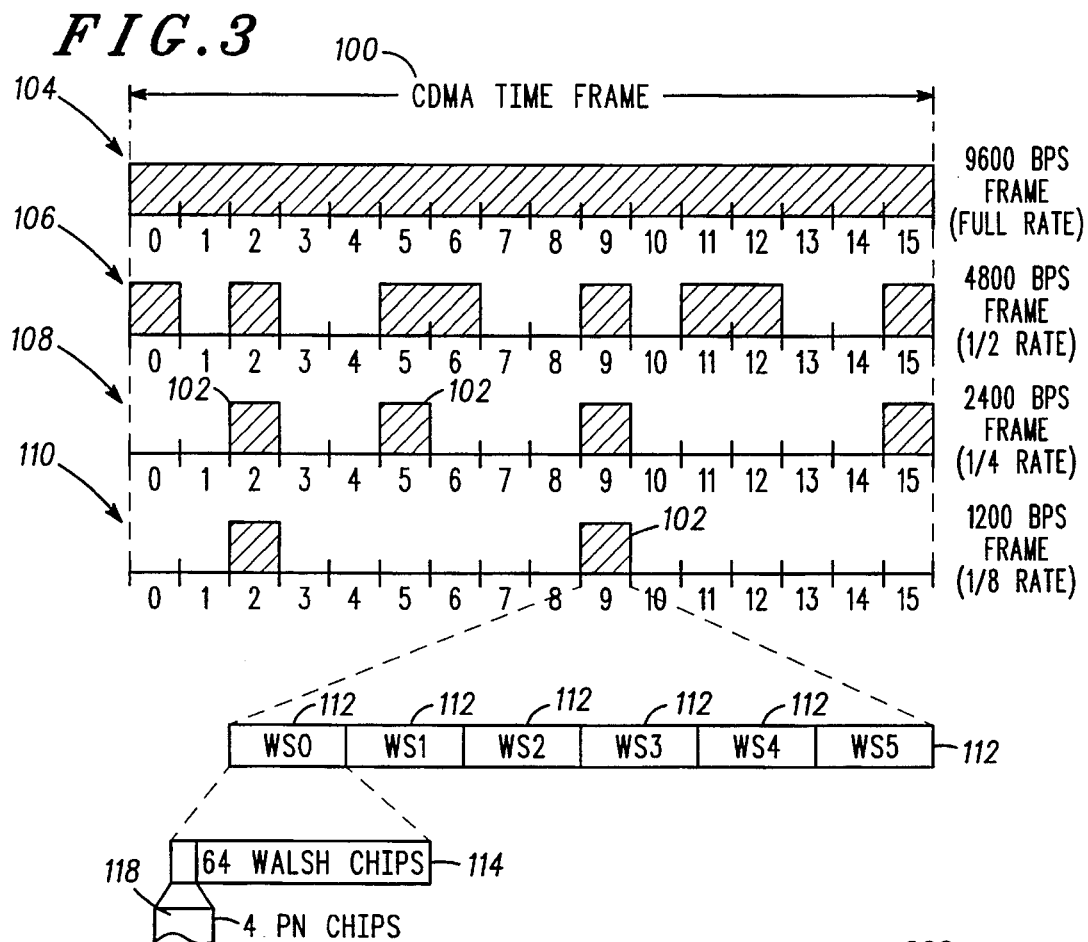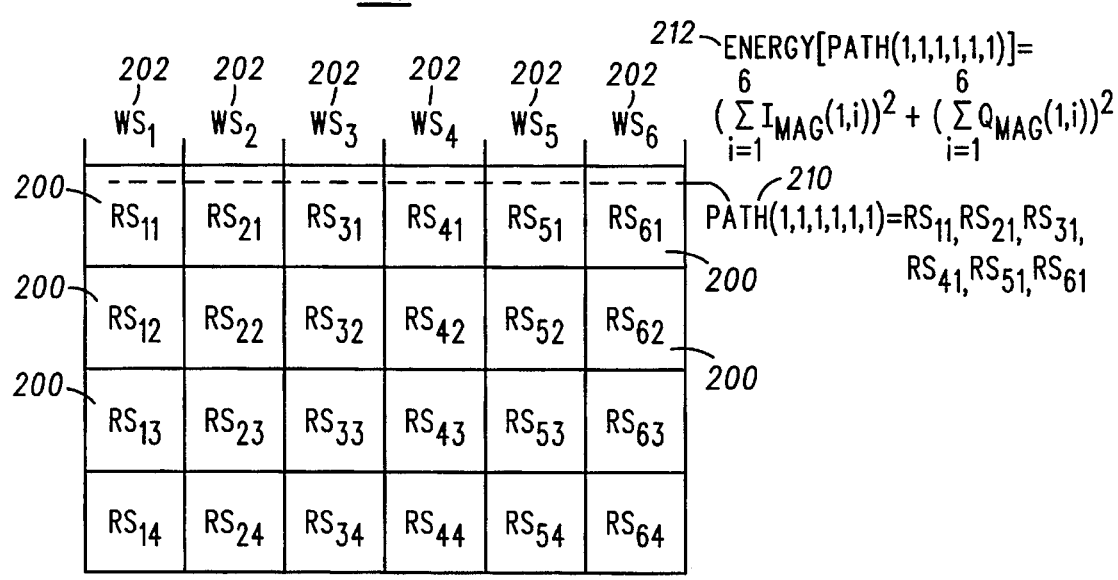

METHOD AND RECEIVER FOR DEMODULATING A RECEIVED SIGNAL

FIELD OF THE INVENTION

The present invention relates generally to the field of communications and more particularly to a method and receiver for demodulating a received signal.

BACKGROUND OF THE INVENTION

A Direct Sequence Code Division Multiple Access (DS/CDMA) cellular communication system, such as the one described in IS-95, is a self interference system. In such a communication system, a number of mobiles and/or portables use the same spectrum in the same geographical area. The signals from the subscriber units are differentiated from each other based on their spreading code (i.e. the user long code PN sequence and the I and Q PN sequences). The capacity limit of such a system is dependent on the amount of self interference in the system. An analogy used to illustrate this point is a cocktail party conversation. If you are at a cocktail party speaking to the person next to you and no one else is in the room with you, you do not have to speak very loud to be heard. When several more people enter the room and start conversing, you have to speak louder to be heard. In other words the self interference has increased and you have to increase your transmitter power to overcome the interference. As more and more people start talking in the room you have to speak louder and louder, and so do the other people in the room, in order to be heard. Eventually, you reach the point where it takes an infinite amount of power to be heard over the other people. That is the capacity limit.

Extending the cocktail analogy, if everyone in the room is hard of hearing you start with a higher level of interference from the other guests than if everyone has normal hearing. Thus, if everyone has better hearing the number of simultaneous conversations that can occur increases, i.e. the system capacity increases. As a result there is a considerable advantage in increasing the receiver's sensitivity in a DS/CDMA system. Any increase in receiver sensitivity directly reduces the amount of transmitter power required and as a result the amount of self interference. Increasing a cellular systems capacity increases an operator's revenue and improves the service the subscriber receives.

The standard receiver in a DS/CDMA system non-coherently detects the transmitted signal. Non-coherent detection does not take into account the phase difference between two transmitted signals. The standard non-coherent receiver first despreads the received signal (i.e. removes the I and Q PN sequences and the user's long code PN sequence) and accumulates a Walsh symbol of data. A Fast Hadamard Transform (FHT) is performed on the despread accumulated data. The FHT essentially correlates the despread signal against the sixty four possible Walsh symbols that could have been sent by the transmitter. The receiver then selects the Walsh symbol with the highest energy (where the energy is determined by summing the square of the I and Q vectors). The non-coherent receiver is an energy detector and does not use the phase of the transmitted signal. It is well known (Sklar, *Digital Communications*, ISBN 0-13-211939-0, Prentice Hall 1988, p. 161–164) that the bit error rate (BER) performance of coherent demodulation is superior to non-coherent demodulation.

Thus there exists a need for a method and receiver that improves a receiver's sensitivity by approaching a coherent demodulation scheme which exploits the coherence of a channel or an adapted channel over several symbols.

BRIEF DESCRIPTION OF THE DRAWINGS

FIG. 1 is a block diagram of a transmitter;

FIGS. 2A and 2B illustrate is a block diagram of a receiver;

FIG. 3 is a Walsh matrix;

FIG. 4 is a time diagram of a CDMA time frame;

FIG. 5 is an array of reduced states; and

DETAILED DESCRIPTION OF THE DRAWINGS

Figure 6:
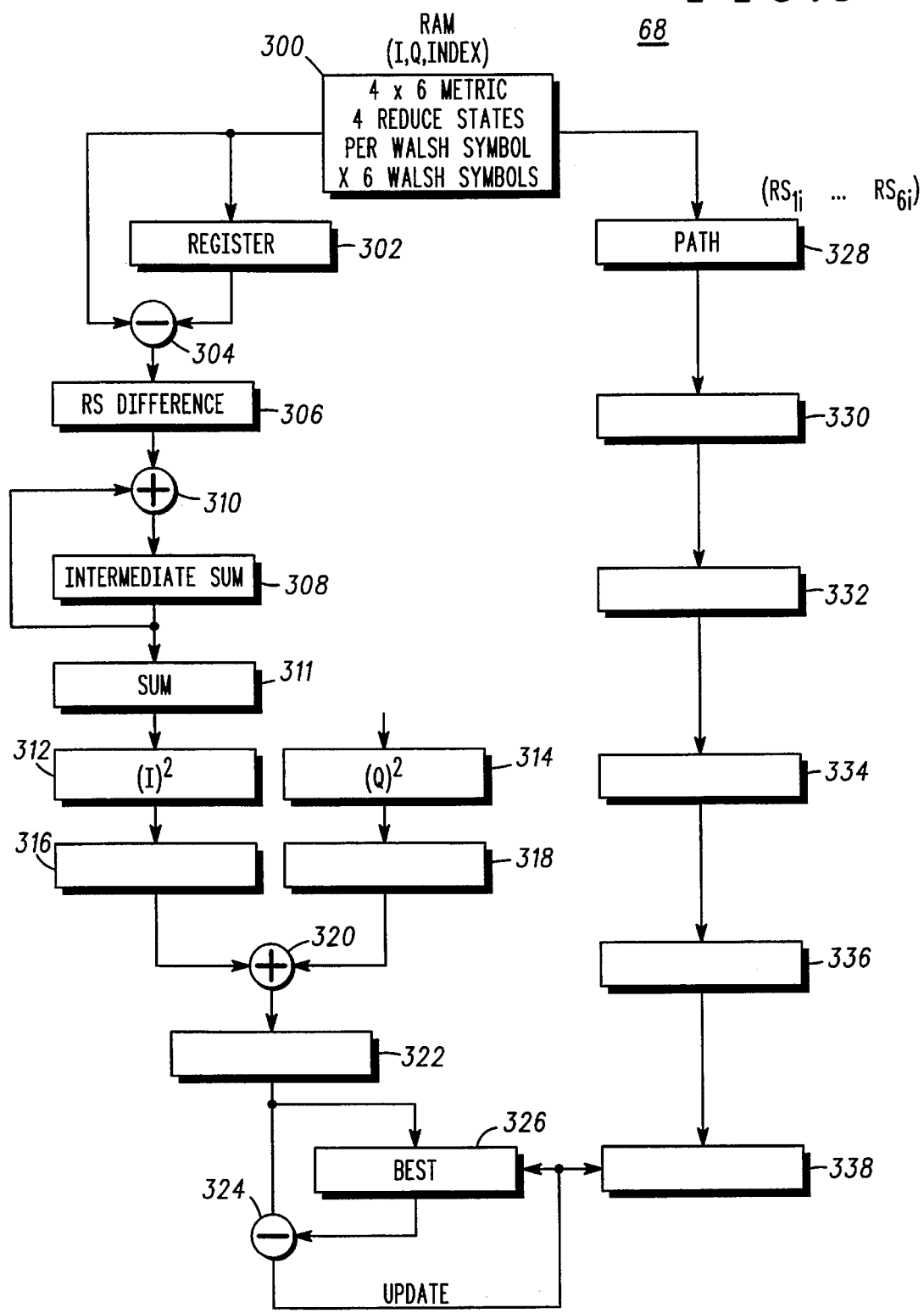
FIG. 6 is a block diagram of part of a reduced state sequence estimator.

In summary, the present invention provides a method and receiver to reduce the probability of error in a DS/CDMA received signal. This reduced probability of error results in lower transmission power requirements, that allow an increased system capacity in a DS/CDMA cellular telephone system. This system performance gain is obtained by an efficient implementation of a Reduced State Sequence Estimator (RSSE).

Figure 2A:
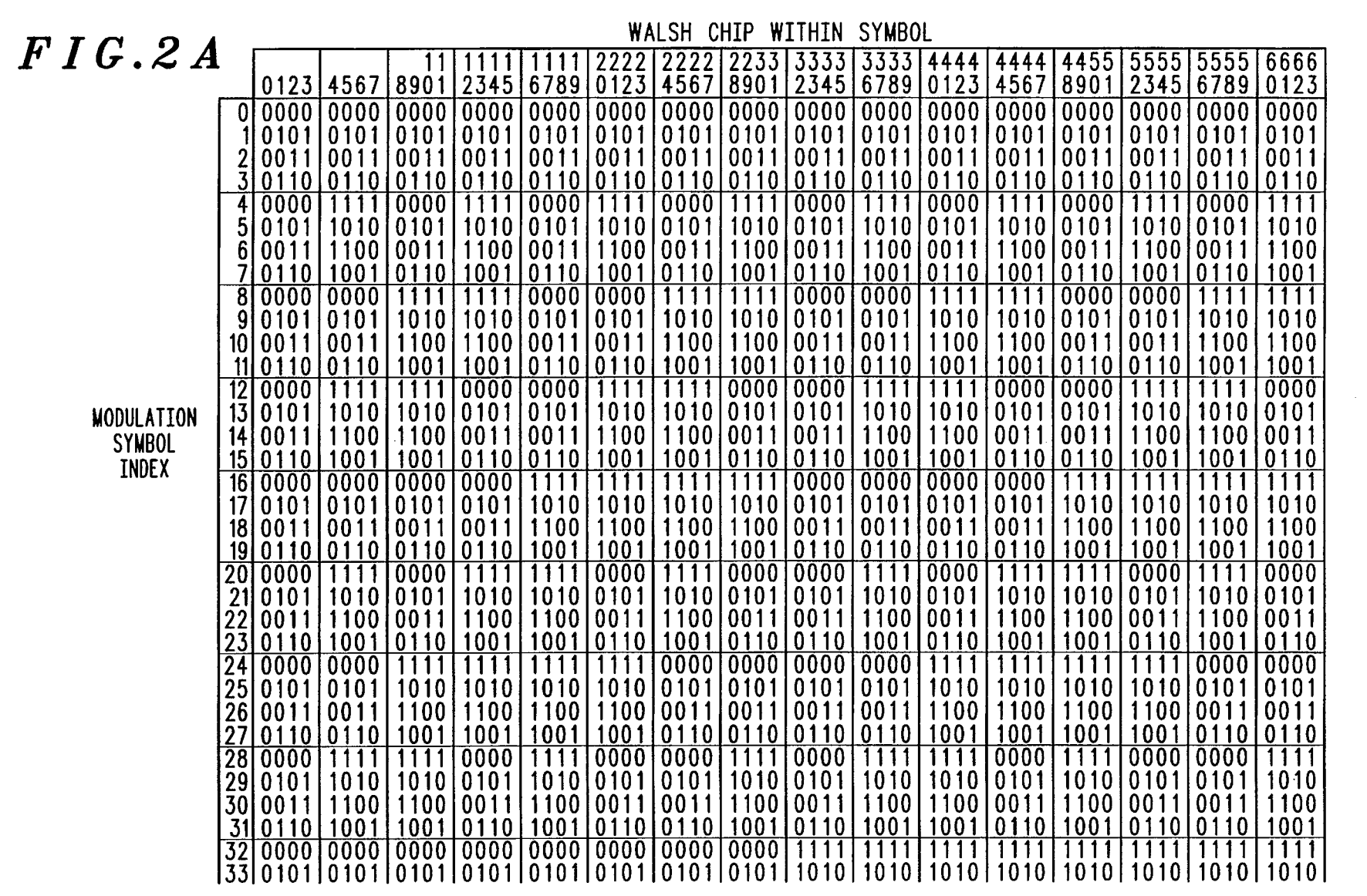
Figure 2B:
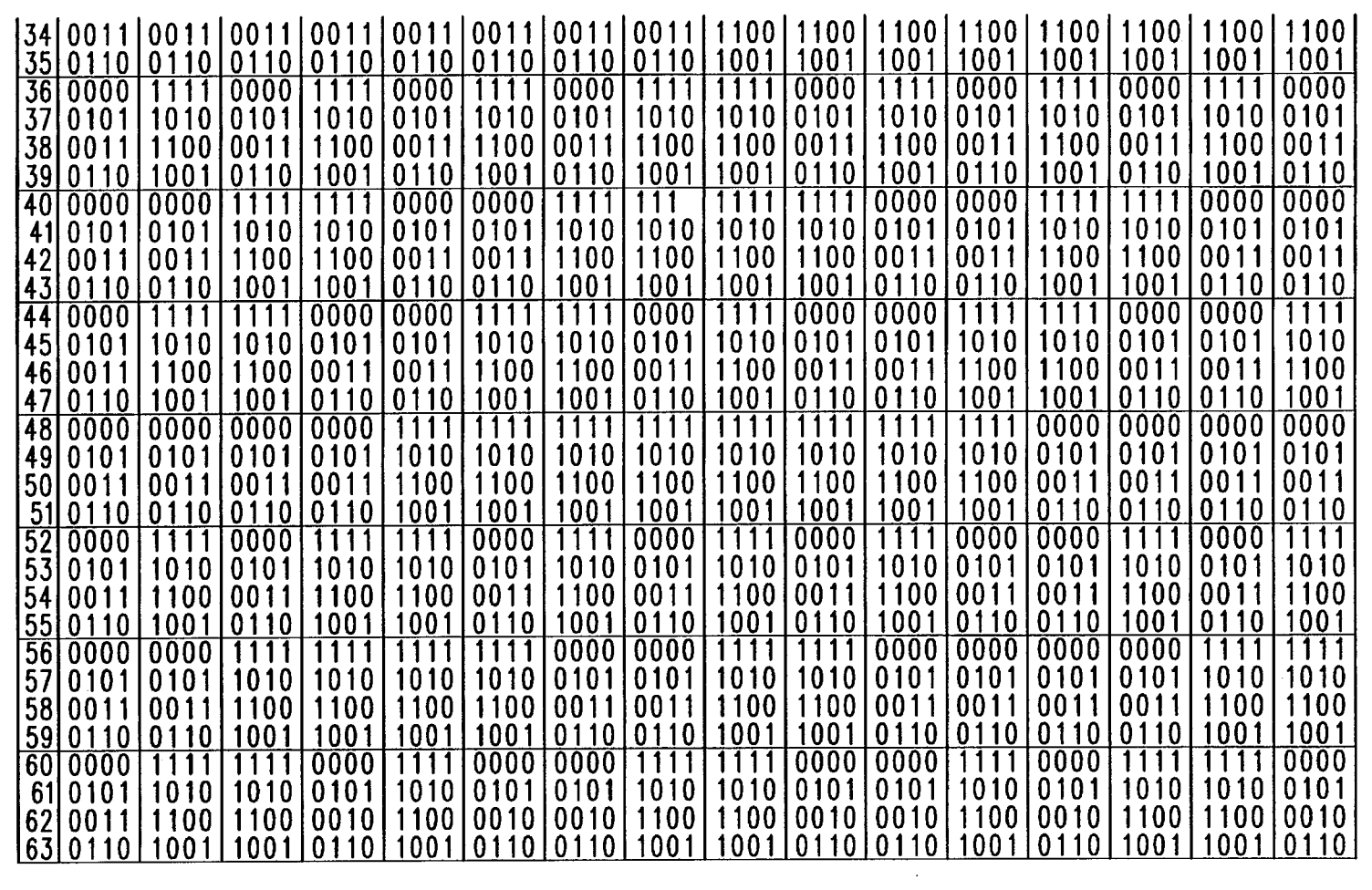

FIG. 1 shows a base site transmitter 10 for use in a reverse link (mobile to base site) of a DS/CDMA cellular telephone system. A voice signal or data signal 12 is input to a coding section 14, resulting in a coded signal 16. The coded signal 16 is mapped, preferably, six symbols at a time, to a unique 64-ary symbol by a 64-ary orthogonal modulator 18. In the preferred embodiment, the 64-ary orthogonal modulator is a Walsh matrix, shown in FIG. 2A and 2B. The six coded symbols are mapped by the equation $C_0+2C_1+4C_2+8C_3+16C_4+32C_5=i$, where $C_{0-5}$ are the coded symbols and i is the index of the output Walsh symbol. Because the symbols are either 1 or 0 the equation uniquely maps the six symbols into one of the 64 Walsh symbols. The output of the 64-ary modulator is a Walsh symbol, that is made up of 64 Walsh chips (a row in the Walsh matrix).

Connected to the modulator is an adder 20, that sums a long pseudorandom noise (PN) sequence 22 with the Walsh chips. The output of the adder 20 is split into an in-phase or I channel 22 and a quadrature-phase or Q channel 24. The I channel 22 has an adder 26, which sums the output of adder 20 with an I PN sequence 28. The Q channel 24 has an adder 38, that sums the output of adder 20 and a Q PN sequence 40. The adder 38 is connected to a delay element 42. Then the I and Q data are bandpass filtered 30, 44, mixed 32, 46 and summed 34 to create the carrier frequency signal that is transmitted by an antenna 36. This results in offset QPSK modulation of the input data stream.

The input speech signal 12 can be either full rate (9600 bps) 104, half rate (4800 bps) 106, quarter rate (2400 bps) 108, or eighth rate (1200 bps) 110. FIG. 3 shows examples of transmissions of various rate data in a CDMA Time Frame 100. The time frame 100 is made up of sixteen power control groups 102. The power control groups 102 are made up of six Walsh symbols 112 and each Walsh symbol 112 is defined by 64 Walsh chips 114. Finally, each Walsh chip 114 has four PN chips 118. The incoming data rate, (full, half . . . ) is determined by the voice activity of the user. Periods where the user says little are encoded at eighth rate, while continuous quick speech might be encoded at full rate. Which power control groups are active during the time frame 100 is determined by the long code 22 and by the voice activity.

A receiver 60, see FIG. 4, in a base station converts the received signal back into a digitized voice signal. Connected to an antenna 62 is a RF downconverter/sampler 63 which processes the received signal with well known techniques to obtain an oversampled (e.g. eight times oversampled) baseband representation of the received signal. The baseband representation is input to a despreader 64, that reverses the Offset QPSK process using the long code PN sequence and the I and Q PN sequences. The despread signal is input to a Fast Hadamard Transform (FHT) 66, which correlates appropriate groups of sixty four received Walsh chips against each of the sixty four possible Walsh symbols. The correlation results in an I magnitude, a Q magnitude and an index for each Walsh symbol. The I magnitude, Q magnitude and the index for each Walsh symbol is referred to as a reduced state. The reduced states are ranked by their energy, which is calculated by squaring the I magnitude and the Q magnitude and then adding the squares. A predetermined number of the reduced states having the highest energy are transferred to a Reduced State Sequence Estimator (RSSE) 68. When the RSSE 68 has collected the reduced states for all six Walsh symbols 112 making up a power control group 102, it calculates path energies for all the reduced states, and selects the path with the highest energy. This calculation will be described in more detail below, with regard to FIGS. 5 and 6. The highest energy (best) path determines the best estimate of the six Walsh symbols that were sent in the power control group. From this information the six coded symbols that correspond to the index of a transmitted Walsh symbol are determined and passed to a decoder 70. The decoder 70 then outputs a digitized voice or data signal 72 that corresponds with the input voice signal 12, in FIG. 1.

The RSSE 68 increases the receiver's 60 sensitivity by picking the path with the greatest coherent energy. Thus, the present invention results in 0.7 dB gain in receiver sensitivity that directly increases the system capacity of a DS/CDMA cellular communication system.

FIGS. 5 & 6 show how the path energies are calculated in the RSSE 68. As stated above, the output of the FHT 66 is a predetermined number of reduced states (RS) 200 that are stored in the RAM 300. In the preferred embodiment, four reduced states 200 with the highest energy are saved for each Walsh Symbol (WS) 202. The energy of the reduced state 200 is related to the probability that the Walsh symbol 202 with the index of the reduced state 200 was sent. Four reduced states 200 are saved in RAM 300 for each of the six Walsh symbols 202 in a power control group, as shown in FIG. 5. Each reduced state 200 contains an I magnitude 204, a Q magnitude 206 and an index 208. A path 210 is determined by selecting one reduced state 200 for each of the six Walsh Symbols 202. For instance, one path 210 {Path(1,1,1,1,1,1)} is $RS_{11}$, $RS_{21}$, $RS_{31}$, $RS_{41}$, $RS_{51}$, & $RS_{61}$. A path energy 212 is calculated by summing the I magnitudes 204 of all the reduced states 200 in the path 210 and squaring the sum, plus the square of the sum of the Q magnitudes 208 of all the reduced states 200 in the path 210. The RSSE 68 performs this energy 212 calculation for every path 210 and chooses the path 210 with the highest energy 212.

The rather large computational task of calculating every path energy 212 can be reduced by noticing that every path 210 only differs from one of the other paths 210 by a single reduced state 200. For instance, Path( 1,1,1,1,1,1 ) only differs from Path(1,1,1,1,1,2) by a single reduced state 200 in $WS_6$. Specifically new reduced state $RS_{62}$ replaces omitted reduced state $RS_{61}$. This allows the new path energy {Path(1,1,1,1,1,2)} to be determined by taking the difference in the I magnitudes and Q magnitudes in $RS_{62}$ and $RS_{61}$, Idiff and Qdiff, and adding these differences to the I mag sum and Q mag sum of Path(I,1,1,1,1,1). As a result, the new I sum and Q sum only require one subtraction operation and one addition operation instead of five addition operations. This allows for the efficient calculation all the path energies 212 of the reduced states 200 in RAM 300.

FIG. 6 illustrates the preferred embodiment of the RSSE 68. At start up a register 302 is held constant at zero, the I magnitude 304 of $RS_{11}$ {Imag (1,1)} from RAM 300 has zero subtracted from it at subtractor 304 and the result is stored in register 306. Next, the Imag(1,1) is added to the intermediate sum, zero in this case, in register 308, at adder 310 and the result is stored in register 308. This process is repeated until all six I magnitudes 204 have been added and the result is stored in register 311.

To calculate the I magnitude for the next path {path (1,1,1,1,1,2)} 210 the I magnitude of $RS_{61}$ is stored in register 302 and the difference between I magnitudes $RS_{61}$ {Imag(6,1)} and $RS_{62}$ {Imag(6,2)} is determined at subtractor 304 and the result is stored in register 306. Further, {Imag(6,2)} is stored in register 302. Next, the difference in register 306 is added to the Imagnitude of the previous path {Path (1,1,1,1,1,1)} and the result is stored in register 308. The new path sum is stored in register 311. The path's total I magnitude is squared at multiplier 312 and the path's total Q magnitude is squared at multiplier 314, with the results stored in registers 316, 318. The squared magnitudes are added at an adder 320 and the result or path energy 212 is stored at a register 322.

The path energy at register 322 is compared, in subtractor 324, against the highest energy path 326 calculated so far. If the new path energy in register 322 is higher than the highest path energy in register 326, the energy at 322 is gated into register 326. If the energy at 322 is smaller than energy at 326 then processing continues with the next path's energy. The reduced states 200 indices for a path 212 are saved in a register 328. As processing continues on that path's energy, the paths indices are shifted through registers 330, 332, 334, 336. If the path's energy is greater than the energy stored in register 326, then the associated path's indices are gated into register 338. By repeating this for all the possible paths the best path energy is determined and stored in register 326 and the reduced states that make up that path are stored in register 338. The I and Q magnitudes of the path 212 are available in RAM 300.

From the indices in register 338 the coded symbols can be determined (see the discussion of the transmitter 10 of FIG. 1 where the coded symbols from the coder 14 are used to determine a unique Walsh symbol). By using the RSSE 68 in the receiver 60 of a CDMA system, a 0.7 dB gain is obtained in the link margin. The preferred implementation of the RSSE 68 shown in FIG. 6 makes it possible to perform the RSSE in real time. As a result, the RSSE can be implemented in a base station of DS/CDMA cellular communication system.

While the invention has been described in conjunction with specific embodiments thereof, it is evident that many alternatives, modifications, and variations will be apparent to those skilled in the art in light of the foregoing description. For instance, the RSSE 68 could be implemented in a general purpose processor, a different number of reduced states or Walsh symbols could be used to calculate the path energies and the receiver could be a rake receiver with multiple fingers. Accordingly, it is intended the invention embrace all such alternatives, modifications, and variations as fall within the spirit and broad scope of the appended claims.

What is claimed is:

1. A method for demodulating a received signal, comprising the steps:
   (a) determining the energy of each of a first plurality of reduced states of a first symbol in the received signal;
   (b) selecting a first subset of the first plurality of reduced states based upon the energy of each of the first plurality of reduced states;
   (c) determining the energy of a second plurality of reduced states of a second symbol in the received signal;
   (d) selecting a second subset of reduced states based upon the energy of each of the second plurality of reduced states of the second symbol;
   (e) calculating a first path energy for a first path, the first path comprising a first reduced state selected from the first subset of reduced states and a second reduced state selected from the second subset of reduced states;
   (f) calculating a second path energy for a second path, the second path comprising the first reduced state selected from the first subset of reduced states and a third reduced state selected from the second subset of reduced states;
   (g) comparing the first path energy and the second path energy.

2. The method of claim 1 further comprising choosing the path with the highest energy.

3. The method claim 1, wherein step (b) further includes the step of choosing the first subset of reduced steps having the highest energies.

4. The method of claim 1, further comprising the step of finding an I value sum for the first path and a Q value sum for the first path.

5. The method of claim 4, wherein the step of finding the second path energy comprises determining the difference in the I value sum due to the second and third reduced states.

6. A method for demodulating a signal, comprising the steps:
   (a) despreading a received signal;
   (b) collecting a plurality of Walsh chips that make up a Walsh symbol;
   (c) performing a FHT on a Walsh symbol having an I and a Q magnitude for each of a plurality of corresponding Walsh Code indices as an output;
   (d) determining an energy for each corresponding Walsh code index;
   (e) selecting a predetermined number of indices with the highest energy saving the I and the Q magnitude and corresponding index as a reduced state;
   (f) repeating steps (b) to (e) for a predetermined number of Walsh symbols;
   (g) summing the I magnitudes and the Q magnitudes of the reduced state in a first path and determining an energy for the first path, the first path comprising at least one reduced state associated with each of the predetermined number of Walsh symbols;
   (h) selecting a next path that differs from a present path by a single reduced state;
   (i) determining the difference in the I and Q magnitudes of a new reduced state from an omitted reduced state resulting in an I difference and a Q difference;
   (j) calculating the next path's I magnitude by adding the previous path's I magnitude to the I difference magnitude and next path's Q magnitude by adding the previous path's Q magnitude to the Q difference magnitude;
   (k) determining an energy of the next path;
   (l) saving the next path's energy in memory if it is higher than any previously calculated path's energy; and
   (m) repeat steps (h) through (l) for all possible paths.

7. A receiver in a CDMA communications system for demodulating a received signal, comprising:
   an antenna for receiving a spread spectrum signal;
   a despreading device responsive to the antenna;
   means responsive to the despreading device for forming a first plurality of reduced states, each of the first plurality of reduced states associated with a first symbol in the spread spectrum signal;
   means for forming a second plurality of reduced states each of the second plurality of reduced states associated with a second symbol in the spread spectrum signal;
   means for calculating a first path energy for a first path, the first path comprising a first reduced state selected from the first plurality of reduced states and a second reduced state selected from the second plurality of reduced states; and
   means for calculating a second path energy for a second path, the second path comprising the first reduced state selected from the first plurality of reduced states and a third reduced state selected from the second plurality of reduced states.

8. A receiver in a CDMA communications system for demodulating a received signal, comprising:
   an antenna for receiving a spread spectrum signal;
   a despreader, coupled to the antenna, having M-ary chips as its output;
   a transformer, coupled to the despreader, and having as its output a plurality reduced states;
   a comparator, coupled to the transformer, selecting a predetermined number of the reduced states based on an energy of the reduced state;
   a sequence estimator, coupled to the comparator, saving the selected reduced states for a predetermined number of symbols and calculating a path energy of the reduced states for a plurality of paths by choosing a subsequent path that differs from a present path by a single reduced state, the sequence estimator calculating the energy of each path by determining the sum of the I magnitudes in the path and determining the sum of the Q magnitudes in the path;
   said sequence estimator choosing a best path based on the calculated path energies; and
   a decoder, coupled to the sequence estimator.

9. The receiver of claim 8, wherein the sum of the I magnitudes for the subsequent path is calculated by determining the I difference between an omitted reduced state and a new reduce state and adding the I difference to the present paths sum of the I magnitudes.

10. A method for demodulating a signal comprising the steps of:
    forming a first plurality of reduced states, each of the first plurality of reduced states based on a first symbol associated with the signal;
    forming a second plurality of reduced states, each of the second plurality of reduced states based on a second symbol associated with the signal;

calculating a first path energy for a first path, the first path comprising a first reduced state selected from the first plurality of reduced states and a second reduced state selected from the second plurality of reduced states; and calculating a second path energy for a second path, the second path comprising the first reduced state selected from the first plurality of reduced states and a third reduced state selected from the second plurality of reduced states.

11. The method of claim 10, further comprising comparing the first path energy to the second path energy.

12. The method of claim 10, further comprising the step of finding an I value sum and a Q value sum for the first path.

13. The method of claim 12, further comprising the step of finding an I value sum and a Q value sum for the second path.

14. The method of claim 13, further comprising the step of determining an energy difference between the second reduced state and the third reduced state.

* * * * *